US006748210B2

(12) United States Patent
Dutta et al.

(10) Patent No.: US 6,748,210 B2
(45) Date of Patent: Jun. 8, 2004

(54) METHOD AND APPARATUS FOR AUTOMATICALLY TERMINATING TO A VOICE MAIL AN INCOMING CALL MADE TO A RADIO TELEPHONE

(75) Inventors: Rabindranath Dutta, Austin, TX (US); Mark Joseph Hamzy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/731,625

(22) Filed: Dec. 7, 2000

(65) Prior Publication Data

US 2002/0072351 A1 Jun. 13, 2002

(51) Int. Cl.[7] ................................................. H04M 3/42
(52) U.S. Cl. ..................... 455/414.1; 455/413; 455/417; 379/201.07; 379/201.1; 379/212.01
(58) Field of Search ............................. 455/404.1, 413, 455/414.1, 417, 418, 421, 550.1; 379/201.02, 201.1, 201.07, 211.01, 211.02, 212.01

(56) References Cited

U.S. PATENT DOCUMENTS

| 4,939,772 | A | * | 7/1990 | Goto ..................... 379/100.16 |
| 5,305,181 | A | | 4/1994 | Schultz ...................... 361/680 |
| 5,586,704 | A | | 12/1996 | Alexander et al. .......... 224/605 |
| 5,963,877 | A | * | 10/1999 | Kobayashi .................. 455/567 |
| 5,966,643 | A | | 10/1999 | Radley ....................... 455/74.1 |
| 5,970,418 | A | | 10/1999 | Budd et al. ................. 455/550 |
| 6,006,114 | A | | 12/1999 | Seppanen et al. ........... 455/567 |
| 6,104,922 | A | | 8/2000 | Baumann .................... 455/410 |
| 6,385,453 | B1 | * | 5/2002 | Foladare et al. ............ 455/445 |

FOREIGN PATENT DOCUMENTS

GB    2 286 092 A   *   9/1995   ............ H04M/1/72

* cited by examiner

Primary Examiner—Edward F. Urban
Assistant Examiner—Simon Nguyen
(74) Attorney, Agent, or Firm—David A. Mims, Jr.; Rudolf O. Siegesmund

(57) ABSTRACT

A radio telephone that automatically terminates an incoming call to a voice mail comprising a transceiver for receiving the incoming call, and a sensor coupled to the transceiver producing a set of parameters related to a user in close proximity to the radio telephone. The incoming call is automatically terminated to the voice mail upon a determination that a subset of the set of parameters is within a range. A method for automatically terminating an incoming call for a radio telephone to a voice mail is described. The method includes providing a set of sensor input information, receiving an incoming call, obtaining at least part of the set of sensor input information, determining a sot of parameters related to the set of sensor input information, and terminating the incoming call to a voice mail system upon a determination that the set of parameters is within a predetermined range.

23 Claims, 3 Drawing Sheets

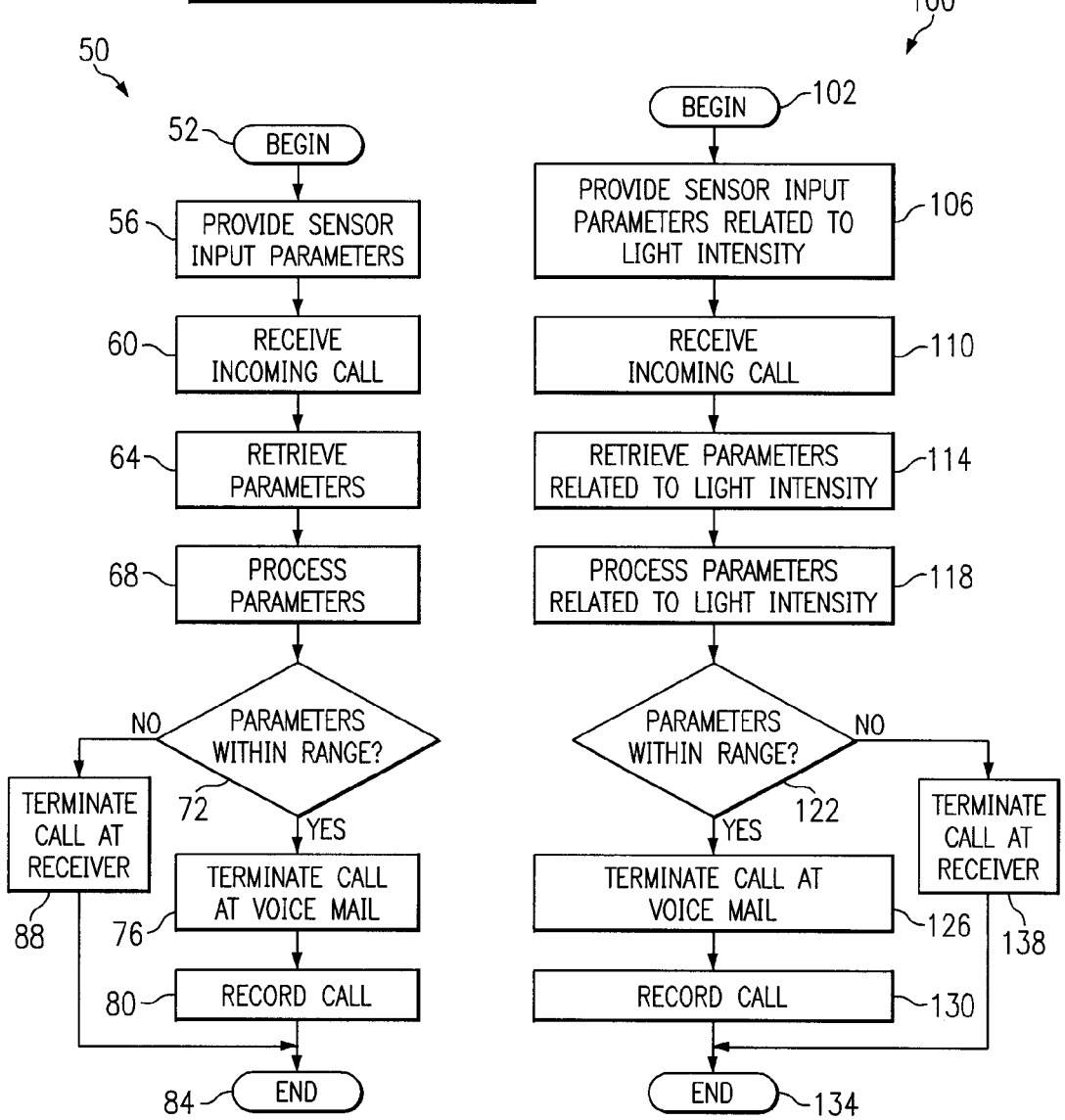

METHOD AND APPARATUS FOR AUTOMATICALLY TERMINATING TO A VOICE MAIL AN INCOMING CALL MADE TO A RADIO TELEPHONE

TECHNICAL FIELD

This invention relates to radio telephone systems, and more particularly, to a telephone system wherein, when a call is made to a radio telephone, under certain conditions, the call automatically terminates to a voice mail.

BACKGROUND OF THE INVENTION

Radio telephones, such as cell phones often ring at inopportune times. For example, when a person is in a meeting, the person's cell phone may ring. Moreover, the phone may ring when the person is asleep. While it is a known practice to set a cell phone to a vibrating mode, it is not very convenient under certain circumstances. For example, one can set the phone to vibrating mode, accidentally leave the phone on a desk, and never feel or receive the vibration intended to alert to an incoming call. In otter words, the user may never "feel the phone ringing." The utilitarian and aesthetic value of radio telephones are increasing among users. Some users wear radio telephones, and especially cell phones, to the same extent they wear watches. More users are likely to wear radio telephones at all times including times when they are asleep.

U.S. Pat. No. 5,586,704 entitled "Shoulder Holster and Method of Carrying a Portable Telephone Near the Body of a User," describes a shoulder holster, and method of carrying a telephone near the body of a user for storage of and ready access to the telephone by the user.

U.S. Pat. No. 5,966,643 entitled "Hand-held Radiotelephone having Two-part Construction," describes a hand-held radio telephone whose earpiece and/or microphone are spatially separated from the other components of the radio telephone U.S. Pat. No. 5,305,181 entitled "Arm or Wrist Mounted Terminal With a Flexible Housing," describes a hand-held body for receiving, storing and transmitting information having a keyboard in the top thereof for manually entering information therein. U.S. Pat. No. 6,006,114 entitled "Radiotelephone Enabling Adjustment of Alerting Indicator Volume/Level During Incoming Calls," describes a method for varying the level of an alerting indicator of a radio telephone while an incoming call is being received. U.S. Pat. No. 6,104,922 entitled "User Authentication in a Communication System Utilizing Biometric Information," describes a method and apparatus for authenticating subscriber units and users in a communications system including a communications node that receives biometric information describing a user, and measures a RF signature of the subscriber unit. U.S. Pat. No. 5,970,418, entitled "Personal Communicator Including a Handset Phone wilt an Integrated Virtual Image Display," describes a wireless handset phone, a virtual image display coupled to the wireless handset phone, and a pointing device for pointing on the virtual image display.

What is needed beyond the prior art is an apparatus and method, which eliminates, or at least reduces inopportune ringing of radio telephones. It is especially desirous to reduce rings when an incoming call is destined for a user who is asleep, while at the same time maintaining the utilitarian value of the incoming call.

SUMMARY OF THE INVENTION

A radio telephone that automatically terminates an incoming call to a voice mail is disclosed comprising a transceiver for receiving the incoming call, and a sensor coupled to the transceiver producing a set of parameters related to a user in close proximity to the radio telephone, whereby, the incoming call is automatically terminated to the voice mail upon a determination that a subset of the set of parameters is within a range. A method for automatically terminating an incoming call that is designated for a radio telephone to a voice mail is described. The method includes providing a set of sensor input information, receiving an incoming call, obtaining at least part of the set of sensor input information, determining a set of parameters related to the set of sensor input information, and terminating the incoming call to a voice mail system upon a determination that the set of parameters is within a predetermined range.

BRIEF DESCRIPTION OF THE DRAWINGS

The present invention will now be described, by way of example, with reference to the accompanying drawings, in which:

FIG. 3 is an alternate embodiment of the radio telephone of FIG. 2;

FIG. 4 is a flow chart depicting a generic method for the present invention;

FIG. 5 is a flow chart depicting a light intensity method for the present invention;

DESCRIPTION OF THE PREFERRED EMBODIMENT

Figure 1:
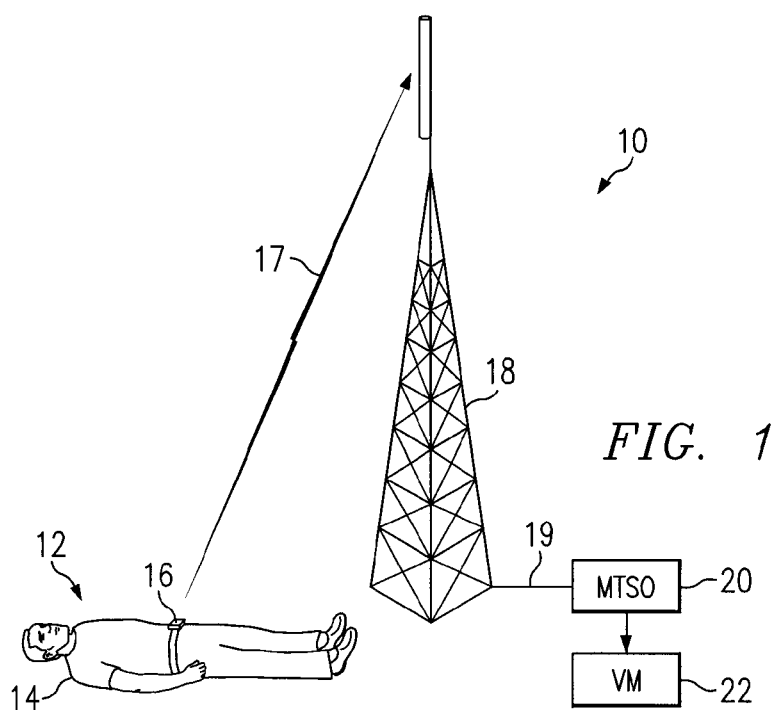
FIG. 1 is a schematic depicting the present invention.

Referring to FIG. 1, transmission system 10 generally denotes a situation depicting the present invention. Incoming call 12 originating from a caller (not shown) to user 14 is described. User 14 has radio telephone 16. Radio telephone 16 has at least one sensor (not shown) associated with the radio telephone 16. The sensor senses a set of parameters. If a parameter is at a predetermined value range, radio telephone 16 will generate first signal 17 to communications node 18 such as a cellular tower. Second signal 19 that is associated with the first signal 17 is communicated from the communications node 18 to Mobile Transport Serving Office (MTSO) 20. The MTSO 20, in turn, generates a set of control signals (not shown) that terminates incoming call 12 to voice mail 22 associated with user 14 or radio telephone 16.

Figure 2:
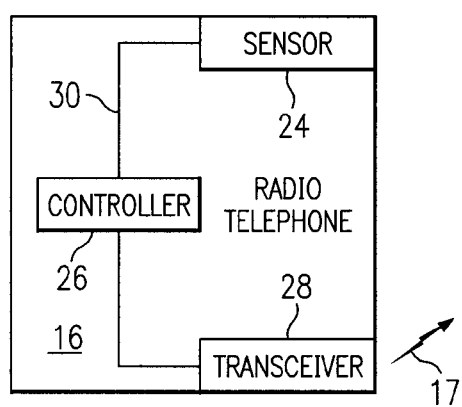
FIG. 2 is a schematic depicting a radio telephone.
Figure 2A:
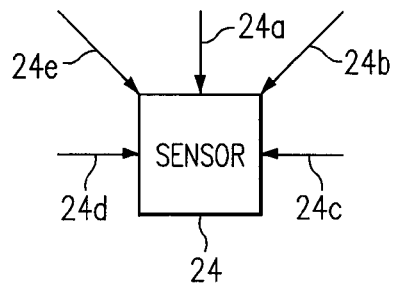
FIG. 2a is a schematic depicting various inputs for a sensor.
Figure 2B:
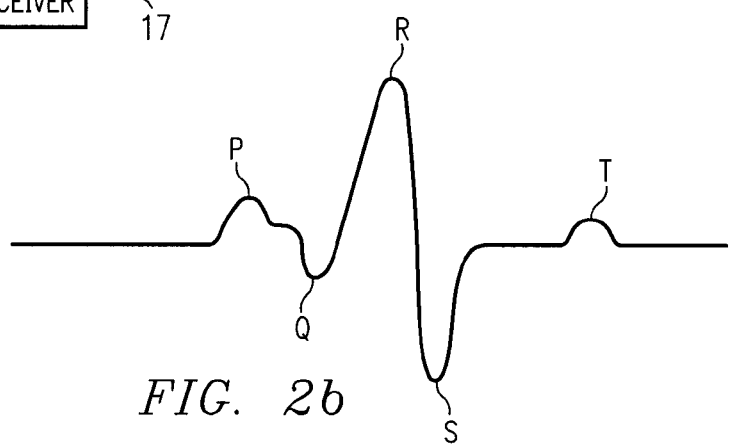
FIG. 2b is an EKG diagram.

Referring to FIGS. 2, 2a, and 2b, a schematic describing a radio telephone of the present invention is described. Radio telephone 16 has sensor 24 that senses a set of parameters. Sensor 24 is coupled to controller 26, which is coupled to transceiver 28. Sensor 24 can be a light sensor such that when it is dark and the ambient light is weak, signal 30 is generated by the sensor 24 and is received by the controller 26. If controller 26 determines that the signal 30 is within a predetermined range, it sends a command to the transceiver 28 commanding it to transmit the signal 17 However, if controller 26 determines that the signal 30 is not within the predetermined range, radio telephone 16 rings.

Sensor 24 can sense pulse rate 24a, sense light intensity 24b, sense body temperature 24c, sense electrocardiograph (EKG) related parameter 24d, as well as sense blood pressure 24e. Sensor 24 can be a pulse rate sensor such that when a pulse rate of user 14 falls below a set point or a set range, signal 30 is generated by sensor 24 and is received by controller 26. If controller 26 determines that signal 30 is within a predetermined range, it sends a command to transceiver 28 commanding it to transmit signal 17. Sensor 24 can also be a temperature sensor such that when a temperature of user 14 falls below a set point or a set range, signal 30 is generated by sensor 24 and is received by controller 26. If controller 26 determines that signal 30 is within a predetermined range, it sends command to transceiver 28 commanding it to transmit signal 17. However, if controller 26 determines that signal 30 is not within the predetermined range, radio telephone 16 rings.

Furthermore, sensor 24 can be a sensor associated with an electrocardiogram (EKG) system such that when a pulse rate of user 14 falls below a set point or a set range, signal 30 is generated by sensor 24 and is received by controller 26. If controller 26 determines that signal 30 is within a predetermined range, it sends a command to transceiver 28 commanding it to transmit signal 17. However, if controller 26 determines that signal 30 is not within predetermined range, radio telephone 16 rings.

As shown is FIG. 2b, a standard EKG graph is depicted. It is known that the shape of P, Q, R, S, & T waves alter as a result of the state of user 14. In other words, the shape of P, Q, R, S, & T waves are different when user 14 is asleep than when user 114 is awake. Therefore, a determination can be made as to whether controller 26 should send a command to transceiver 28 commanding it to transmit signal 17. In addition, sensor 24 can also be a blood pressure sensor such that when a blood pressure of user 14 falls below a set point or a set range, signal 30 is generated by sensor 24 and is received by controller 26. If controller 26 determines that signal 30 is within a predetermined range, it sends a command to transceiver 28 commanding it to transmit signal 17. However, if controller 26 determines that signal 30 is not within the predetermined range, radio telephone 16 rings.

When user 14 falls asleep, some parameters associated with the body of user 14 will change in comparison to those same parameters when user 14 is awake. Therefore, the above described sensors can determine whether to terminate incoming call 12 to radio telephone 16, or terminate incoming call 12 to voice mail 22 for later retrieval by user 14. It is further noted that a predetermined range or set point of parameters sensed by sensor 24 varies from person to person. Therefore, the predetermined range or set point can be adjusted on a personal basis. Alternatively, based upon statistical means such as sampling, the predetermined range or set point can be determined for a group of users based upon known factors.

Referring to FIG. 3, an alternate embodiment of the present invention is depicted. Sensor 24, instead of residing within radio telephone 16 is outside or at some distance from radio telephone 16. Distance 34 exists between sensor 24 and radio telephone 16. Sensor 24 and radio telephone 16 are still coupled together for communication purposes. For example, sensor 24 may include an infrared transmitter (not shown) for communicating sensed information to radio telephone 16. Radio telephone 16 may include transceiver 28 that receives sensor signal 38 from sensor 24. Transceiver 28 is coupled to controller 26. Signal 40 is generated by transceiver 28 and sent to controller 26. If controller 26 determines that signal 40 is within a predetermined range, it sends command 42 to transceiver 28 commanding transceiver 28 to transmit signal 17. However, if controller 26 determines that signal 40 is not within the predetermined range, radio telephone 16 rings.

Referring to FIG. 4, general method 50 depicts a method for implementing the present invention. General method 50 begins (52) and a set of sensor input parameters is provided (56). Note that the set of sensor input parameters includes any value of the parameters that can be sensed by sensors that are described in the present invention or application. An incoming call is received by a receiver such as radio telephone 16 (60). Next, some of the sensor input parameters are retrieved for further processing (64). Some of the sensor input parameters are further processed into something suitable for later use or processing (68). A determination is made as to whether the subset of the sensor input parameters, which are used for comparison purposes, is within a predetermined range (72). If the determination is made that the subset of sensor input parameters is within a predetermined range, then, the incoming call is terminated at a voice mail device without causing a ring of the receiver (76). In other words, instead of ringing, the call goes to the voice mail wherein it is further processed. The process may include asking the caller to leave a message. Father, the voice may inform the caller that the user of the receiver is asleep or otherwise unavailable to answer the incoming call immediately in person. A record or indication of the incoming call is recorded and sent to the receiver (80). Note that the record or indication can be sound, alphanumeric text, graphics, or any suitable means that cause the user to take notice of the fact that the incoming call occurred. General method 50 ends (84). If a determination is made that the subset of the sensor input parameters is outside or not within the predetermined range, the call terminates at the receiver such as radio telephone 16 (88). The user who has the receiver answers the incoming call and method 50 ends (84).

Referring to FIG. 5, light intensity method 100 depicts a method for a particular approach toward the present invention. Light intensity method 100 begins (102). A set of sensor input parameters, which are related to light, is provided (106). Note that the set of sensor input parameters includes any value that is related to light such as the intensity of light in its suitable measurement units. For example, if the light intensity is stronger than a predetermined set point, the parameters will show one value; otherwise, a different value is represented. Next, an incoming call is received by a receiver such as radio telephone 16 (110). Some of the sensor input parameters are retrieved for further processing (114). Some of the sensor input parameters are further processed into something suitable for later use or processing (118). A determination is made whether the subset of the sensor input parameters, which are used for comparison purposes, is within a predetermined range (122). If a determination is made that the subset of the sensor input parameters is within a predetermined range, then the incoming call is terminated at a voice mail device without causing a ring of the receiver (126). In other words, instead of ringing, the call goes to the voice mail wherein it is further processed. The process may include asking the caller to leave a message. Further, the process may include informing the user that the user of the receiver is asleep or otherwise unavailable to answer the incoming call at that time. Next, a record or indication of the incoming call is recorded and sent to the receiver (130). Note that the record or indication can be sound, alphanumeric text, graphics, or any suitable means that cause the user to take notice of the fact that the incoming call occurred. After step 130, light intensity method 100 ends (134). If a determination is made that the subset of the sensor input parameters is outside or not within the predetermined range, the call terminates at the receiver such as radio telephone 16 (138). The user who has the receiver answers the incoming call and light intensity method 100 ends (134).

Figure 6:
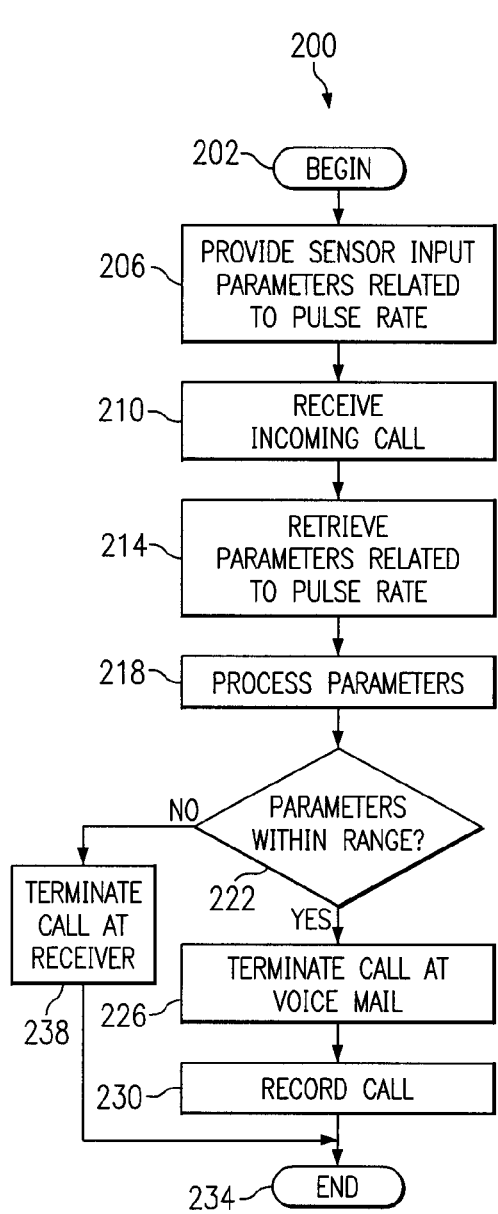
FIG. 6 is a flow chart depicting a pulse rate method for the present invention.

Referring to FIG. 6, pulse rate method 200 depicts a further particularized approach toward the present invention. Pulse rate method 200 begins (202) and a set of sensor input parameters, which are related to the pulse rate of the user of the receiver, is provided (206). Note that the set of sensor input parameters includes any value that is related to the pulse rate of the user of the receiver. Note that the pulse of the user tends to slow down during the period that the user is asleep. For example, if the pulse rate is greater than a predetermined set point the parameters will show one value; otherwise, a different value is represented. An incoming call is received by a receiver such as radio telephone 16 (210). Some of the sensor input parameters are retrieved for further processing (214). Some of the sensor input parameters are further processed into something suitable for later use or processing (218). A determination is made whether the subset of the sensor input parameters, which are used for comparison purposes, is within a predetermined range (222). If a determination is made that the subset of the sensor input parameters are within a predetermined range, then the incoming call is terminated at a voice mail device without causing a ring of the receiver (226). In other words, instead of ringing, the call goes to die voice mail wherein it is further processed. The process may include asking the caller to leave a message. Further, the voice may inform the caller that the user of the receiver is asleep or otherwise unavailable to answer the incoming call at that time. Next a record or indication of the incoming call is recorded and sent to the receiver (230). Note that the record or indication can be sound, alphanumeric text graphics, or any suitable means that cause the user to take notice of the fact that the incoming call occurred. Pulse rate method 200 ends (234). If a determination is made that the subset of the sensor input parameters are outside or not within the predetermined range, the call terminates at the receiver such as radio telephone 16 (238). The user who has the receiver answers the incoming call and pulse rate method 200 ends (234).

Figure 7:
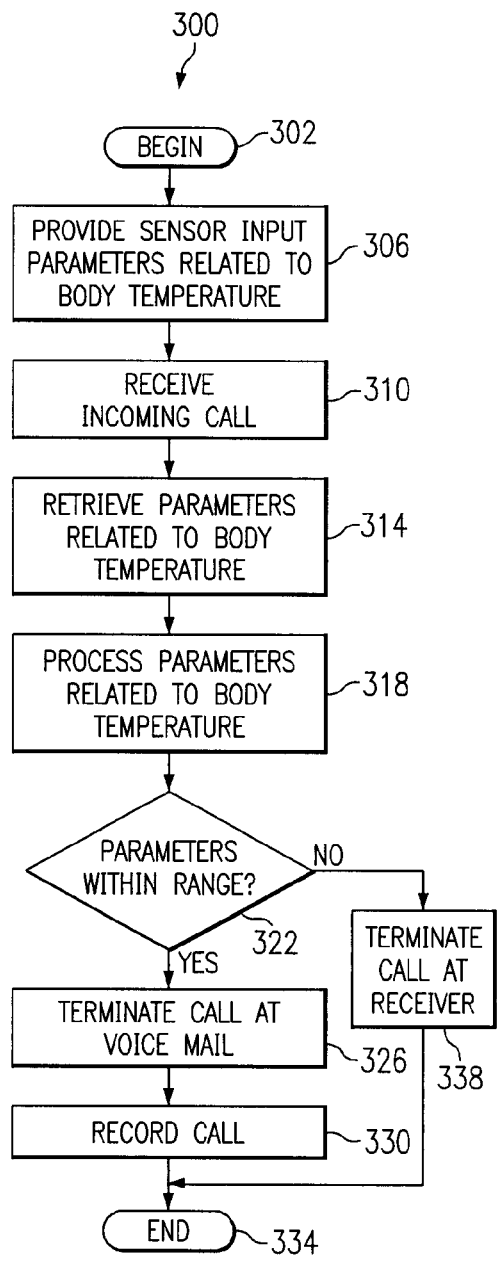
FIG. 7 is a flow chart depicting a body temperature method for the present invention.

Referring to FIG. 7, body temperature method 300 depicts a method for a particular approach toward the present invention. Body temperature method 300 begins (302). A set of sensor input parameters, which are related to body temperature of the user, is provided. Note that the set of sensor input parameters includes any value that is related to body temperature of the user such as values coming out of an infrared (IR) sensor. For example, if body temperature of the user is higher or lower than a predetermined set point, the parameters will show one value; otherwise, a different value is represented. An incoming call is received by a receiver such as radio telephone 16 (310). Some of the sensor input parameters are retrieved for further processing (314). Some of the sensor input parameters are further processed into something suitable for later use or processing (318). A determination is made whether the subset of the sensor input parameters, which are used for comparison purposes, is within a predetermined range (322). If the subset of the sensor input parameters is within a predetermined range, the incoming call is terminated at a voice mail device without causing a ring of the receiver (326). In other words, instead of ringing, the call goes to the voice mail wherein it is further processed. The process may include asking the caller to leave a message. Further, the voice may inform the caller that the user of the receiver is asleep or otherwise unavailable to answer the incoming call immediately in person. A record or indication of the incoming call is recorded and send to the receiver (330). Note that the record or indication can be sound, alphanumeric text, graphics, or any suitable means that cause the user to take notice of the fact that the incoming call occurred and body temperature method 300 ends (334).

If the subset of the sensor input parameters is outside or not within the predetermined range, the call terminates at the receiver such as radio telephone 16 (338). The user who has the receiver answers the incoming call and body temperature method 300 ends (334).

It is noted that the set of sensor input parameters of FIGS. 4, 5, 6 and 7 can be related to EKG or blood pressure as well.

The present invention can be embodied in the form of computer-implemented processes and apparatuses for practicing those processes. The present invention can also be embodied in the form of computer program code containing instructions embodied in tangible media, such as floppy diskettes, CD-ROMs, EPROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As can be appreciated, the present invention teaches a radio telephone that automatically terminates an incoming call to a voice mail. The radio telephone comprises a transceiver for receiving the incoming call, and a sensor coupled to the transceiver producing a set of parameters related to a user in close proximity to the radio telephone, whereby, the incoming call is automatically terminated to the voice upon a determination that a subset of the set of parameters is within a range.

The present invention further teaches a method for automatically terminating an incoming call that is designated for a radio telephone to a voice mail. The method includes providing a set of sensor input information, receiving an incoming call, obtaining at least pan of the set of sensor input information, determining a set of parameters related to the set of sensor input information, and terminating the incoming call to a voice mail system upon a determination that the set of parameters is within a predetermined range.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A radio telephone comprising:
   a transceiver for receiving an incoming call;
   wherein responsive to the transceiver receiving the incoming call, the radio telephone performs steps comprising:

determining ifs user is asleep by analyzing a property associated with the user;

responsive to the determination char the user is nor asleep, terminating the incoming call to the radio telephone; and responsive to the determination the user is asleep, terminating the incoming call to a voicemail.

2. The radio telephone of claim 1 wherein the radio telephone does not ring or vibrate when the incoming call is terminated to the voicemail.

3. The radio telephone of claim 1 wherein the property is an amount of light detected by a light sensor; wherein the amount of light being low indicates that the user is asleep; and wherein the amount of light being high indicates that the user is awake.

4. The radio telephone of claim 1 wherein the property is a pulse for the user; wherein the pulse being less than the user's normal resting pulse indicates that the user is asleep; and wherein the pulse being equal to or more than the user's normal resting pulse indicates that the user is awake.

5. The radio telephone of claim 1 wherein the property is a body temperature for the user; wherein the body temperature being less than the user's normal body temperature indicates that the user is asleep; and wherein the body temperature being equal to or more than the user's normal body temperature indicates that the user is awake.

6. The radio telephone of claim 1 wherein the property is an EKG pattern for the user; wherein the EKG pattern being not equal to the user's normal EKG pattern indicates that the user is asleep; and wherein the EKG pattern being equal to the user's normal EKG pattern indicates that the user awake.

7. The radio telephone of claim 1 wherein the property is a blood pressure for the user, wherein the blood pressure being less than the user's normal blood pressure indicates that the, user is asleep; and wherein the blood pressure being equal to or more than the user's normal blood pressure indicates that the user is awake.

8. A method for terminating an incoming call comprising:

receiving an incoming call;

determining if a user is asleep by analyzing a property associated with the user;

responsive to the determination that the user is not asleep, terminating the incoming call to a radio telephone; and responsive to the determination the user is asleep, terminating the incoming call to a voicemail.

9. The method of claim 8, wherein the radio telephone does not ring or vibrate when the incoming call is terminated to the voicemail.

10. The method of claim 8, thither comprising recording an indication associated with said incoming call.

11. The method of claim 8 wherein the property is an amount of light detected by a light sensor; wherein the amount of light being low indicates that the user is asleep; and wherein the amount of light being high indicates that the user is awake.

12. The method of claim 8 wherein the property is a pulse for the user; wherein the pulse being less than the user's normal resting pulse indicates that the user is asleep; and wherein the pulse being equal to or more than the user's normal resting pulse indicates that the user is awake.

13. The method of claim 8 wherein the property is a body temperature for the user; wherein the body temperature being less than the user's normal body temperature indicates that the user is asleep; and wherein the body temperature being equal to or more than the user's normal body temperature indicates that the user is awake.

14. The method of claim 8 wherein the property is an EKG pattern for the user; wherein the EKG pattern being not equal to the user's normal EKG pattern indicates that the user is asleep; and wherein the EKG pattern being equal to the user's normal EKG pattern indicates that the user is awake.

15. The method of claim 8 wherein the property is a blood pressure for the user; wherein the blood pressure being less than the user's normal blood pressure indicates that the user is asleep; and wherein die blood pressure being equal to or more than the user's normal blood pressure indicates that the user is awake.

16. A storage medium encoded with machine-readable computer program code for automatically terminating an incoming call designated for a radio telephone, said storage medium including instructions causing a computer to implement a method comprising:

receiving an incoming call:

determining if a user is asleep by analyzing a property associated with the user;

responsive to the determination that the user is not asleep, terminating the incoming call to a radio telephone; and responsive to the determination the user is asleep, terminating the incoming call to a voicemail.

17. The storage medium of claim 16 wherein the radiotelephone does not ring or vibrate when the incoming call is terminated to the voicemail.

18. The storage medium of claim 16, further comprising instructions for causing a computer to implement: recording an indication associated with said incoming call.

19. The storage medium of claim 16 wherein the property is an amount of light detected by a light sensor; wherein the amount of light being low indicates that the user is asleep; and wherein the amount of light being high indicates that the user is awake.

20. The storage medium of claim 16 wherein the property is a pulse for the user; wherein the pulse being less than the user's normal resting pulse indicates that the user is asleep; and wherein the pulse being equal to or more than the user's normal resting pulse indicates that the user is awake.

21. The storage medium of claim 16 wherein the property is a body temperature for the user; wherein the body temperature being less than the user's normal body temperature indicates that the user is asleep; and wherein the body temperature being equal to or more than the user's normal body temperature indicates that the user is awake.

22. The storage medium of claim 16 wherein the property is an EKG pattern for the user; wherein the EKG pattern being not equal to the user's normal EKG pattern indicates that the user is asleep; and wherein the EKG pattern being equal to the user's normal EKG pattern indicates that the user is awake.

23. The storage medium of claim 16 wherein the property is a blood pressure for the user; wherein the blood pressure being less than the user's normal blood pressure indicates that the user is asleep; and wherein the blood pressure being equal to or more than the user's normal blood pressure indicates that the user is awake.

* * * * *

UNITED STATES PATENT AND TRADEMARK OFFICE
CERTIFICATE OF CORRECTION

PATENT NO. : 6,748,210 B1
DATED : August 12, 2004
INVENTOR(S) : Dutta et al.

It is certified that error appears in the above-identified patent and that said Letters Patent is hereby corrected as shown below:

<u>Title page</u>,
Item [57], ABSTRACT, "sot" should be -- set --

<u>Column 1</u>,
Line 21, "otter" should be -- other --
Line 37, "telephone" should be -- telephone. --
Line 53, "wilt" should be -- with --

<u>Column 2</u>,
Line 65, "17" should be -- 17. --

<u>Column 3</u>,
Line 31, "114" should be -- 14 --

<u>Column 4</u>,
Line 24, "Father" should be -- Further --

<u>Column 5</u>,
Line 16, "point" should be -- point, --
Line 29, "die" should be -- the --
Line 36, "text" should be -- text, --

<u>Column 6</u>,
Line 14, "FIGS." should be -- FIG. --
Line 50, "pan" should be -- part --

<u>Column 7</u>,
Line 1, "ifs" should be -- if a --
Line 3, "char" should be -- that --
Line 3, "nor" should be -- not --
Line 36, "the," should be -- the --
Line 50, "thither" should be -- further --

UNITED STATES PATENT AND TRADEMARK OFFICE
CERTIFICATE OF CORRECTION

PATENT NO.    : 6,748,210 B1
DATED         : August 12, 2004
INVENTOR(S)   : Dutta et al.

It is certified that error appears in the above-identified patent and that said Letters Patent is hereby corrected as shown below:

Column 8,
Line 13, "die" should be -- the --
Line 21, "call:" should be -- call; --

Signed and Sealed this

Twenty-first Day of September, 2004

JON W. DUDAS
*Director of the United States Patent and Trademark Office*